United States Patent Office

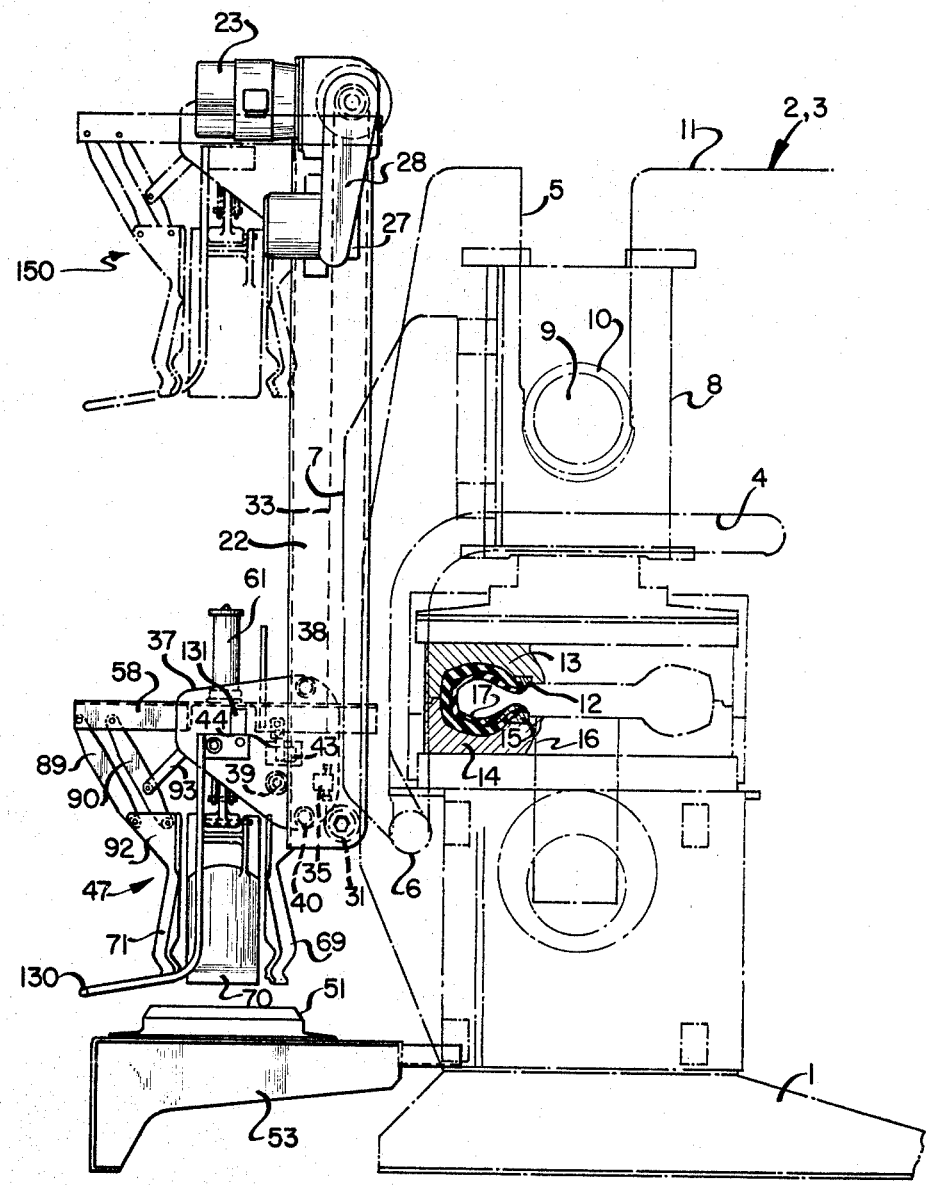
FIG_1

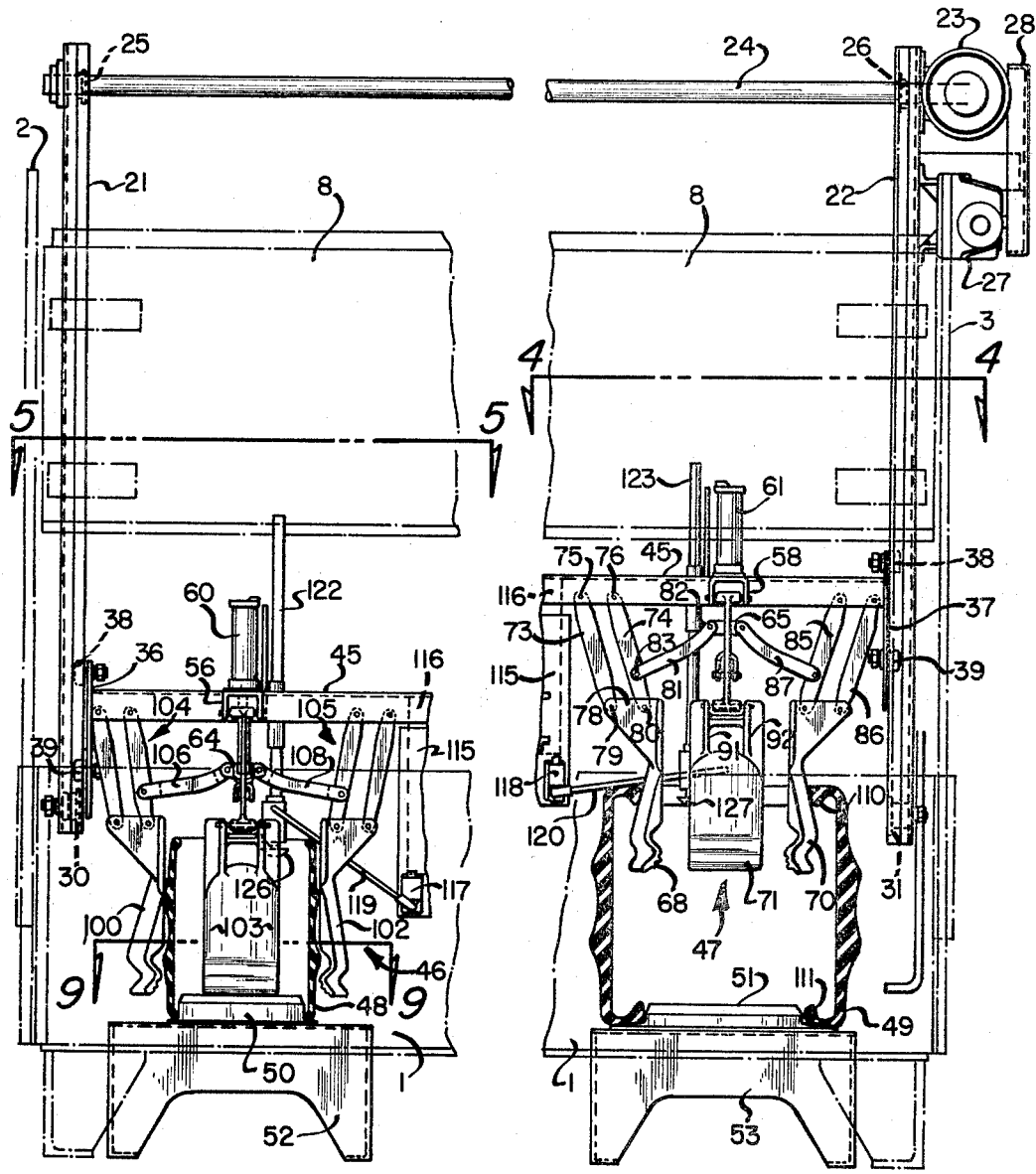

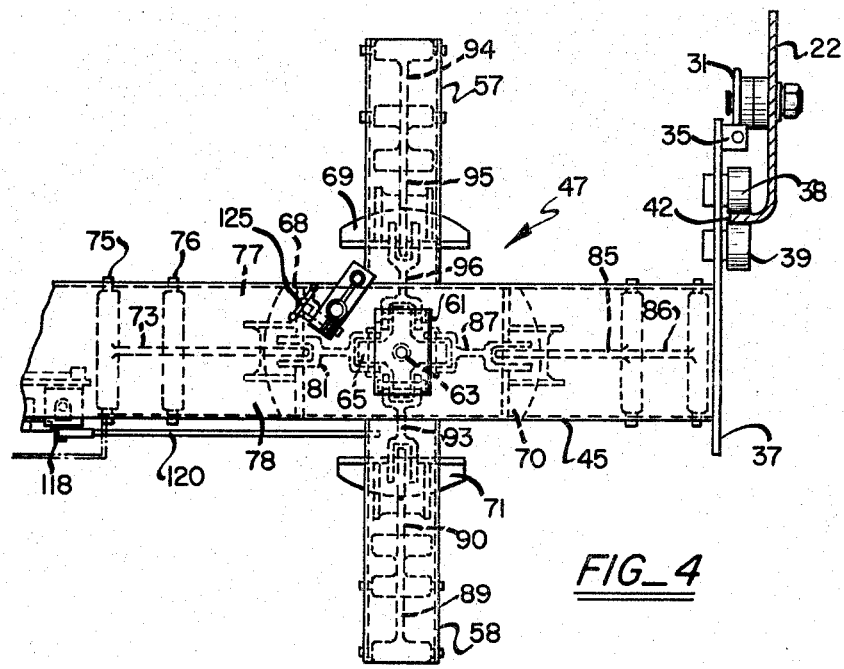
FIG_4
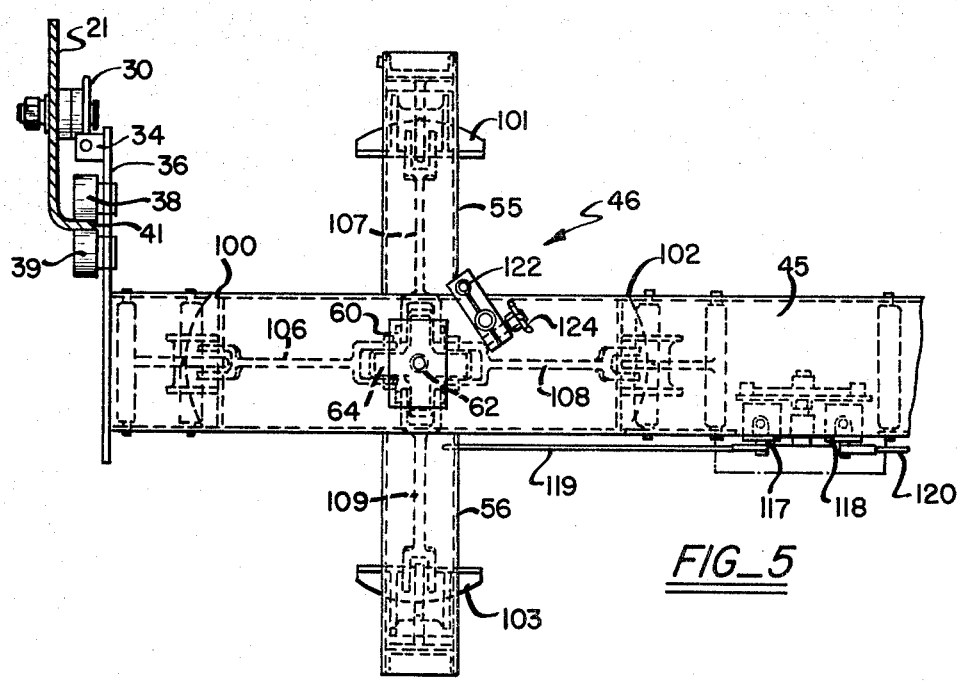
FIG_5
INVENTOR.
ERNEST S. ULM
BY
Oberlin, Maky & Donnelly
ATTORNEYS Aug. 23, 1966 E. S. ULM 3,267,515
TIRE CURING PRESS LOADER
Filed Oct. 4, 1963 4 Sheets-Sheet 4
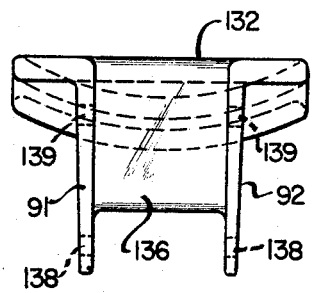
FIG_8
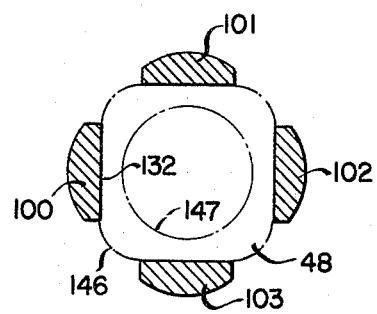
FIG_9
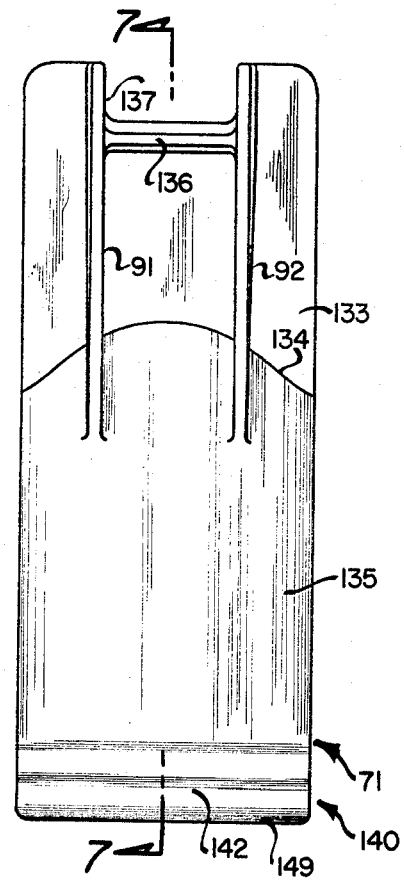
FIG_6
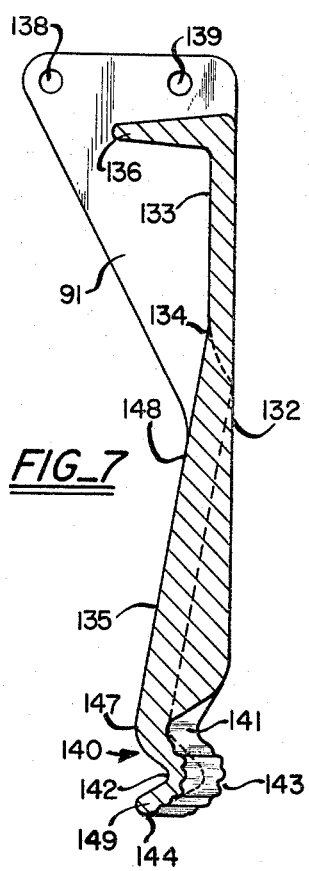
FIG_7
INVENTOR.
ERNEST S. ULM
BY
Oberlin, Maky & Donnelly
ATTORNEYS

3,267,515
Patented August 23, 1966

3,267,515
TIRE CURING PRESS LOADER
Ernest S. Ulm, Stow, Ohio, assignor to NRM Corporation, a corporation of Ohio
Filed Oct. 4, 1963, Ser. No. 314,052
7 Claims. (Cl. 18—2)

This invention relates generally as indicated to a tire curing press loader and more particularly to a tire press loader wherein tire carcasses of widely varying sizes and types may conveniently and automatically be loaded into the press by the same loader mechanism.

In some tire carcasses, it is desirable to grip the carcass by a tire press loader exteriorly thereof avoiding contact with the interior of the carcass. An example of such tire carcass would be that for a tubeless automobile tire which is provided with a special liner. If a tire carcass chuck were employed interiorly gripping the carcass, the liner in the carcass might be damaged. Accordingly, a tire carcass holder which will firmly grip such a tire carcass exteriorly while maintaining such carcass substantially in the desired shape is required. However, in some larger tire carcasses, as for example, shoulder built or dual bead carcasses for truck tires, it is desirable to grip the carcass interiorly supporting the same by means of the upper shoulder or bead of the carcass. Moreover, the weight and size of the larger carcasses may make exterior friction gripping unfeasible. Heretofore, it has been necessary to provide special carcass holders for various types of tire carcasses requiring substantial modification of the press when it is desired to vulcanize a different size or type of tire.

It is accordingly a principal object of the present invention to provide a tire curing press and loader therefor which will properly grip tire carcasses either internally or externally.

A further principal object is the provision of a tire carcass holder for a tire curing press which will properly grip a wide variety of tire carcass types and sizes.

Another object in the provision of a tire carcass loader for tire curing presses and the like which will pick up a wide variety of size and types of tire carcasses and properly hold the same to be accurately positioned in the mold of the tire curing press. For example, flat drum built tires, crown drum type, dual bead tires and pre-shaped radial cord banded or belted tires may be utilized with the present invention.

A yet further object is the provision of a tire curing press and universal loader therefor of a simplified construction having relatively few parts.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a side elevation of a tire curing press and loader therefor in accordance with the present invention;

FIG. 2 is a fragmentary front elevation of the press and loader as seen from the left in FIG. 1 illustrating one half of the loader with the tire gripping elements of the chuck in one position;

FIG. 3 is a fragmentary front elevation similar to FIG. 2 illustrating the other half of the press and loader therefor showing the tire gripping elements of the other chuck in a different position;

FIG. 4 is a fragmentary enlarged horizontal section taken substantially on the line 4—4 of FIG. 2;

FIG. 5 is a similar fragmentary enlarged horizontal section taken substantially on the line 5—5 of FIG. 3;

FIG. 6 is an enlarged exterior elevation of a tire gripping element of the chuck;

FIG. 7 is a vertical center section of the element taken on the line 7—7 of FIG. 6;

FIG. 8 is a top plan view of the element; and

FIG. 9 is a diagrammatic horizontal section showing such elements exteriorly gripping a carcass as taken on the line 9—9 of FIG. 3.

Referring now to the annexed drawings and more particularly to FIGS. 1, 2, and 3, the press therein illustrated comprises a base 1 to opposite sides of which are secured upstanding plates 2 and 3 in each of which are aligned guide slots 4 and 5. Guide rollers 6 mounted on depending brackets 7 secured to the upper press head 8 ride in slots 4 and serve to maintain the upper press head 8 and the mold sections carried thereby in parallelism with the mold sections mounted in the base of the press.

The press head 8 is mounted on a horizontally extending shaft 9 provided with rollers 10 at each end which are supported in the slots 5. To open the press from the closed position illustrated in FIG. 1, the shaft 9 is raised in the slot 5 and moved backwardly along the top edges 11 of the plates 2 and 3. The rollers 6 mounted on the brackets 7 will ride in the slots 4 in each plate 2 and 3 maintaining the press head in the proper position preventing it from swinging about the axis of the shaft 9. Opening and closing movement of the press head is obtained by means of links connecting each end of the shaft 9 exteriorly of the plates 2 and 3 to bull gears mounted on the sides of the base 1 of the press. The bull gear cranks are driven by electric motor driven gear reducers driving pinions in mesh with the teeth of such bull gears. Reference may be had to U.S. Patent No. 3,065,499 to J. W. Brundage et al., entitled "Tire Carcass Holder and Curing Press," for a more clear disclosure of the type of press illustrated.

It will be understood that the illustrated press is capable of vulcanizing two tires simultaneously in that the press head includes two side-by-side top mold sections which mate when the press is closed with two side-by-side bottom mold sections in the base 1. The top mold sections 13 include a top toe ring 12 which may be vertically moved with respect to the top mold section to strip a vulcanized tire from the top mold section when the press is open. Similarly, the bottom mold section 14 includes a toe ring 15. The bottom mold section 14 and the toe ring 15 will, of course, be exposed and cleared for overhead loading of the tire carcass when the press is in its open position. A well 16 in the center of the bottom mold section projecting into the base 1 may be provided to receive a bladder 17 which may be drive into such well by a vertically extensible ram mounted in the press head 8 and axially aligend with each of the two mold sections therein. The bag or bladder when driven into the well 16 will be invaginated and can be forced into engagement with the interior of the tire carcass placed on the bottom mold section by the application of steam or other fluid pressure within the well 16. Reference may be had to U.S. Patent No. 3,097,394 to Edwin E. Mallory and Armindo Cantarutti, dated July 16, 1963, entiteld "Tire Curing Press," for a more clear disclosure of the mounting of the bladder and the bladder inverter.

The loader of the present invention, shown generally at, comprises two upstanding guides 21 and 22 mounted on the brackets 7 secured to each side of the press head 8. A drive motor 23 mounted on the top of the guide 22 drives a shaft 24 extending between the guides 21 and 22.

Sprockets 25 and 26 are mounted on such shaft 24. The motor 23 may also be employed to drive a rotary switch assembly shown at 27 by means of the power take-off 28. Vertically aligned with the sprockets 25 and 26 are idler sprockets 30 and 31, respectively, mounted on the interiors of the guides 21 and 22 at the bottoms thereof. Chains 33 may be trained about the sprockets 25, 30 and 26, 31, respectively. Such chains 33 are not continuous, but fastened at each end to lugs 34 and 35 on holder plates 36 and 37, respectively. The holder plates 36 and 37 are thus secured to the chains 33 for movement therewith. Each of the holder side plates 36 and 37 is provided with three outwardly directed rollers rotating in axes normal to such plates as indicated at 38, 39 and 40 in FIG. 1. The rollers 38 and 40 on each of the side plates may be on the inside of vertically extending inturned flanges 41 and 42 on the outer edges of the guides 21 and 22, respectively. The rollers 39 may be on the exterior of such flanges, the flanges being then between the rollers 39 on the exterior and the rollers 38 and 40 on the interior. Such flanges then serve as vertically extending rails along which the side plates 36 and 37 ride. Rollers 43 mounted on brackets 44 for rotation on axes in the plane of the plates 36 and 37 may engage the inner edges of the flanges 41 and 42 maintaining the proper lateral spacing of the plates with respect to the guide rails.

Extending between the side plates 36 and 37 is an elongated inverted channel-shape beam 45 which supports therefrom tire carcass holders 46 and 47 which may be identical in form. The two tire carcass holders or chucks 46 and 47 are side-by-side on the loader and correspond to the two side-by-side molds in the tire press. Tire carcasses of varying sizes and shapes shown at 48 and 49 in FIGS. 3 and 2, respectively may be placed on pilots or centering rings 50 and 51 mounted on stands 52 and 53 removably attached to the front of the press. The holders will then lift the carcasses from such pilots or supports and positively place the carcasses on the bottom toe rings 15 of the bottom mold sections when the press head has been elevated and moved rearwardly when the press is open.

At each of the holders, the longitudinally extending or main beam 45 is provided with oppositely directed relatively short transverse beams 55, 56, 57 and 58, each of which may also be of the inverted channel-shape, but somewhat smaller than the main beam 45. The holder actuating piston-cylinder assemblies 60 and 61 are mounted on top of the main beam 45 between the transverse beams 55 and 56, and 57 and 58, respectively. The rods 62 and 63 of such piston-cylinder assemblies extend vertically through the web of the main beam 45 and are secured at their lower ends to cruciform chuck actuators 64 and 65, respectively. The actuators 64 and 65 thus vertically movable by means of the respective piston-cylinder assemblies 60 and 61, are employed to open and close the carcass chucks.

Four tire carcass gripping elements 68, 69, 70 and 71 for the holder 47 are suspended from the beam 45 and the two oppositely extending transverse beams 57 and 58 by means of parallelogram linkages. The two links 73 and 74 supporting the element 68 are pivoted at 75 and 76 to pins or the like extending between the downturned flanges of the beam 45. The links 73 and 74 are also pivoted between flanges 77 and 78 at the top or upper end of the element at 79 and 80, respectively. An operating link 81, clevised at each end, is pivoted at its inner end at 82 to one of the projections of the cruciform actuator 65 and at its opposite end to the link 74 at 83 fairly close to the bottom of such link 74.

The element 70 will similarly be supported from the main beam 45 by parallelogram links 85 and 86 with the link 85 being connected to the actuator 65 by means of the link 87. The chuck elements 68 and 70 are thus identically supported from the beam 45 on opposite sides of the actuating piston-cylinder assembly 61.

The chuck element 71 is supported from the beam 58 by two parallelogram links 89 and 90 pivoted at their upper end between the flanges of the transverse beam 58 and at their lower ends between rearwardly projecting flanges or webs 91 and 92 on the upper end of the element 71. A clevised operating link 93 is pivoted to the link 90 fairly close to the bottom thereof and is connected at its inner end to the corresponding projection on the actuator 65. The element 69 is similarly supported by parallelogram links 94 and 95 pivoted at their upper ends to the beam 57 and at their lower ends to the upper end of the element 69. An operating link 96 is pivoted to the actuator 65 at its inner end and to the link 95 at its outer end fairly near the bottom thereof. (See FIG. 4.)

It can now be seen that as the piston-cylinder assembly 61 is extended and retracted, the cruciform actuator 65 will be moved vertically thus causing the segments to pivot toward and away from each other about the upper pivots of the respective parallelogram linkages. Such parallelogram linkages will, however, always maintain the elements 68 through 71 parallel to each other and vertically extending.

The holder 46, which may be identical in form to the holder 47, comprises the elements or gripping shoes 100, 101, 102 and 103 with the elements 100 and 102 being supported from the main beam 45 by the illustrated parallelogram linkages 104 and 105 in FIG. 3 and the elements 101 and 103 being similarly supported by parallelogram linkages from the transverse beams 55 and 56, respectively. As seen in FIG. 5, the actuator 64 mounted on the rod 62 of the piston-cylinder assembly 60 is connected to the respective parallelogram linkages by operating links 106, 107, 108 and 109.

It can now be apparent that the holder 46 shown in FIGS. 3 and 5 is in a more open position with the rod 62 of the piston-cylinder assembly extended while the holder 47 shown in FIGS. 2 and 4 is more contracted with the rod 63 retracted. Thus as in FIG. 3, the elements 100 through 103 may be employed externally to grip the carcass 48 and the piston-cylinder assembly retracted to apply the gripping pressure. However, as in FIG. 2, the elements 68 through 71 may be employed internally of a somewhat larger carcass 49 and the elements may be expanded or the piston-cylinder assembly 61 extended internally to grip such carcass. For example, in the illustrated embodiment, measuring from the interior of the elements, the elements may move from a maximum open position 24.875 inches apart to a minimum closed position 12.375 inches apart. However, measuring from the exterior of the elements, the dimensions of the maximum open position and minimum closed position substantially increase.

In the larger carcasses such as the dual bead carcass 49 shown in FIG. 2, which may be employed for large truck tires, such carcasses are built with shoulder beads 110 and 111. Accordingly, the external surfaces on each of the elements may then be employed to engage the top shoulder 110 to elevate the larger carcasses. The pressure in the piston-cylinder assembly 61 may be employed to expand the elements maintaining the elements in engagement with the tire carcass beneath the shoulder and maintaining the carcass properly vertically positioned and firmly gripped by the holder 47. However, when the elements are used externally of the carcass as seen in FIG. 3, retraction of the piston-cylinder assemblies will be required to maintain the elements in gripping engagement with the exterior of the carcass.

A depending bracket 115 mounted centrally on the beam 45 is provided with a terminal box 116 at the top thereof and two limit switches 117 and 118 at the bottom thereof. The bracket 115 may be vertically adjusted with respect to the beam 45 to control the position of the limit switches 117 and 118. Switch operating arms 119 and 120 are connected to such bracket for pivotal movement with respect thereto. The function of the operating arms and limit switches is now believed apparent in that the arms extend over the tops of the tire carcasses and as the loader is lowered along the guides 21 and 22, the arms will be engaged by the tops of the carcasses and pivoted with respect to the bracket. When the arms obtain a certain predetermined angular position with respect to the bracket, the limit switches 117 and 118 may be actuated thereby, respectively. This actuation of the switches 117 and 118 may then be employed to permit actuation of the piston-cylinder assemblies 60 and 61, respectively, to cause the elements to move to engage or grip the respective tire carcasses.

Also mounted on the beam 45 adjacent the piston-cylinder assemblies 60 and 61 are posts 122 and 123 which may be vertically adjusted by the knob actuated clamps 124 and 125, respectively, shown in FIGS. 5 and 4, respectively. On the bottoms of such posts, are plungers 126 and 127 which can thus be adjusted to project downwardly just inside the top of the carcass to be picked up by the holder. The plungers 126 and 127 will serve as bladder detectors when the carcasses are placed on the bottom mold section of the press. The bladder 17 will initially be within the well 16 retracted from the area between the mold sections. When the carcass is placed on the bottom toe ring 15, the bladder 17 will be pressurized by steam or fluid pressure within the well 16 causing the same to move upwardly inside the carcass set on the bottom mold section. As the bladder moves upwardly, it will engage the plungers 126 and 127. The piston-cylinder assemblies 60 and 61 will usually be actuated on a certain time delay after the engagement by the bladder with the plungers 126 and 127. This will permit the bladder pressure to be released causing the same to settle to a certain extent gripping more firmly the carcass in the mold section. A safety bar 130 extends across the front of the loader and is mounted at each side on the loader side plates 36 and 37 to actuate limit switches 131 should there be any obstruction in the path of the loader as it descends along the guides 21 and 22.

Each of the elements 68 through 71 of the holder 47 and the elements 100 through 103 of the holder 46 may be identical in form, and with reference to FIGS. 6 through 8, the element 71 will be described in detail. Each element or gripping shoe comprises a vertically elongated generally rectangular member having a flat or planar inner surface 132 and an upper planar outer surface 133 which merges at 134 with a conical surface 135, the axis of the cone of which is parallel to the planar inner surface 132 and offset to the right thereof as seen in FIG. 7. The intersection of the conical surface 135 and the plane surface 133 forms a parabolic merger line 134 therebetween. The webs or flanges 91 and 92 project from the exterior surfaces 133 and 135 and are interconnected by a horizontal flange 136 near the top thereof. The element 71 is recessed as indicated at 137 between the flanges 91 and 92 and above the horizontal flange 136. Aligned apertures 138 and 139 are provided in each of the flanges to accommodate the lower pivots of the parallelogram linkages supporting the holder elements.

The bottom of each element terminates in an S-shape portion 140 of circular or arcuate shape providing an interior circular groove 141 and an exterior circular groove 142. The internal arcuate or circular surface of the S-shape potion 140 may be provided with horizontal serrations indicated at 143 from adjacent the bottom of the groove 141 to the extreme bottom of the element at 144. The serrations 143 serve to contact the bladder 17 as it is inflated into a carcass held by the elements internally to prevent the bladder from expanding unduly axially and to prevent the bladder from moving upwardly between the elements and a bladder plate, should such be employed. Reference may be had to the copending application of Allen L. Heston et al., Serial No. 298,152, filed July 29, 1963, entitled "Tire Curing Press and Loader Therefor," now Patent No. 3,229,329, for a more clear disclosure of such a bladder plate and its function.

It can now be seen that each element is provided with a plurality of carcass engaging or gripping surfaces. The flat or planar interior surface 132 may be employed to grip externally smaller or passenger car carcasses such as 48 as indicated in FIG. 9. It has been found that the flat or planar surface is preferable to a fixed arcuate surface since an arcuate surface would be ideal only for a single size tire carcass. The flat surface 132 may engage the exterior or tread portion of the carcass and cause the tread or center portion to distort bulging somewhat as indicated at 146 between the elements 100 through 103 in FIG. 9 but maintaining substantially total flat surface contact between the inner surface 132 and the center tread portion of the carcass. The bead rings, indicated schematically at 147, will, however, remain substantially circular to enable the carcass thus gripped to be placed on the toe rings 15 of the bottom mold sections of the press. In this manner, the proper gripping pressure may be applied to the carcasses externally regardless of the size thereof.

The exterior conical surface 135 presents in different horizontal planes, an exterior carcass bead engaging surface of different radii which will engage the upper bead 110 of the carcass 49 at different vertical positions therealong depending upon the internal diameter of the bead being gripped as seen in FIG. 2. Thus a large internal diameter bead might be gripped fairly close to the maximum radius point 147 thereof while a carcass having a smaller internal diameter of the bead might be gripped closer to the top as indicated at 148 by a portion having a smaller radius. The arcuate or circular groove 142 in the exterior of the element which terminates in a shelf or hook portion 149 at the bottom thereof may also be employed to grip the inturned bead of tire carcasses and especially tires of the preshaped radial cord banded or belted construction where it is important to hold the bead in a predetermined position. This will locate the tire band in the proper position for curing in the mold and prevent runout caused by improper placement of the tire in the mold. Also the groove 142 is needed for smaller more flimsy passenger tire carcasses such as those illustrated and described in the aforementioned copending application of Allen L. Heston et al., Serial No. 298,152, now Patent No. 3,229,329. Accordingly, a substantially universal carcass holding element is provided which will grip properly a wide variety of types and sizes of tire carcasses.

*Operation*

The operator may place two tire carcasses of the type of 48 or 49 on the centering or pilot rings 50 and 51 in the front of the press and it is noted that the carcasses, although usually of the same type, may be of different sizes and types depending upon the particular molds employed in the press. With the press closed and the tire chucks or holders 46 and 47 in the phantom line position illustrated at 150 in FIG. 1, the holders may be lowered along the guides 21 and 22 by energization of the drive motor 23 causing the chain 33 vertically to lower the holders. The chucks will, of course, be in their open or closed positions, preset, so as to telescope either externally or internally with respect to the carcasses thus set on the centering rings 50 and 51. If the carcass is of the type shown at 48 or of a passenger car type, the piston-cylinder assembly will be extended so that the elements 100 through 103 will telescope over the exterior of the carcass 48. If the carcass is somewhat larger as in the case of the truck tire carcass 49, the elements 68 through 71 will be in their closed position shown in FIG. 1 so as to telescope within the upstanding carcass.

As the loader moves down along its guides 21 and 22, the feeler arms 119 and 120 will engage the top of the upright carcasses and signal to the machine when the holders are in position to grip the carcasses. If the switches 117 and 118 are not actuated by the proper positioning of the arms 119 and 120, respectively, the holder will not be actuated to grip the carcass and the press will not move through its cycle. A signal may be energized indicating to a nearby operator that the cycle of the press is being held until a carcass is properly positioned. The operator may then jog the loader up along the guides 21 and 22 and properly set the carcass on the centering ring. The loader is then lowered and upon the proper energization of the switches 117 and 118, the piston-cylinder assemblies 60 and 61 will be actuated to grip the carcasses thus positioned. In the case of the passenger carcass, the piston-cylinder assembly 60 will be retracted causing the elements 100 through 103 to move inwardly frictionally to grip the exterior of the passenger carcass at the tread portion thereof as indicated in FIG. 9. In the case of the truck carcass 49, the loader need not be lowered to the same extent as the loader for the passenger carcass. The piston-cylinder assembly 61 will be then actuated to extend causing the elements 68 through 71 to move outwardly to the position shown in FIG. 2. The holder is then elevated by means of the drive motor 23 lifting the tire.

It has been found that it is desirable to grip large and heavy truck tire carcasses internally by means of the quite firm upper bead 110 thereof. In any event, it is the same chuck and holder employed for either carcass. However, the air pressure in cylinders 60 and 61 may be regulated to apply the desired proper gripping pressure. With the tire carcasses thus properly gripped, the holder is then raised to the phantom line position 150 shown in FIG. 1 and the operator may now replace the original carcasses with two more carcasses on the centering rings 50 and 51. The press will now open with the head pivot 9 moving up through the slot 5 and back along the top 11 of the side cam plates 2 and 3 to open the mold sections 13 and 14. The opening of the mold sections in this manner moves the top press head upwardly and laterally to clear the bottom mold section for overhead loading. Of course, as the head 8 moves upwardly and laterally, the holders will also move due to the fact that they are mounted on the press head by means of the brackets 7. When the press is completely open, the chucks 46 and 47 will then be vertically aligned with the toe rings 15 of the bottom mold sections. Accordingly, the drive motor 23 may now be energized to move the chains 33 to lower the holders along the guides 21 and 22 to set the tire carcasses held thereby on the bottom toe rings 15. The well 16 may now be pressurized to cause the bladder 17 to expand upwardly from the well and into the tire carcasses held on the bottom mold section by the still gripping tire chucks 46 and 47. The bladders 17 will contact the bladder detector plungers 126 and 127 causing the release of the tire carcasses on delay. Normally, the pressure in each well 16 will be relieved momentarily permitting the bladder to settle and more firmly grip the carcasses set on the bottom toe rings. The piston-cylinder assemblies 60 and 61 may then be energized either to extend or retract causing the segments to release the carcass and the drive motor 23 will again be energized to move the chains 33 to elevate the holder along the guides 21 and 22. When the press closes, the loader will be at the top of the guides 21 and 22 in the phantom line position 150 shown in FIG. 1. The motor 23 may then be energized to lower the holder along the guides 21 and 22 to pick up the next two carcasses set on the centering rings 50 and 51. When the carcasses are picked up and returned to the elevated position, the operator may then set two more carcasses on such centering rings. The press will then have two carcasses in the mold sections being vulcanized, two carcasses on the holders 46 and 47 in the elevated position of the loader, and two carcasses set on the centering rings 50 and 51.

Since the press cycle may take from 20 to 30 minutes, the machine is then set to proceed through approximately three vulcanizing cycles without the operator again feeding additional tire carcasses to the machine. When the cycle is complete, the press will open and the vulcanized tire will be carried by the top press head to be discharged to the rear of the press and such opening of the press will again place the holders with the carcasses held thereby in registry with the bottom mold section. Energization of the motor 23 will then lower the holders along the guides setting the carcasses on the bottom mold sections, now cleared, repeating the above-described cycle.

It can now be seen that the identical holder or chuck can be universally employed either for gripping exteriorly the smaller passenger carcasses or internally the larger heavier truck carcasses. In both instances, the elements will move always in parallelism due to the suspended support thereof through the parallelogram linkage employed. The elements may then be swung to open or closed positions simply by extending or retracting the actuating cylinders 60 and 61. Therefore, with a single loading mechanism, a multiplicity of sizes and types of tire carcasses can be loaded into the press.

Other modes of applying the principles of the invention may be employed, change being made as regards the details described, provided the features stated in any of the following claims or the equivalent of such be employed.

I, therefore, particularly point out and distinctly claim as my invention:

1. In combination, a carcass holder for a tire curing press of the type having complementary top and bottom mold sections, holder guide means mounted on such press to support such holder for vertical movement, means laterally to shift said guide means to register said holder with such bottom mold section when such press is open, means operative vertically to move said holder along said guide means, said holder comprising a plurality of vertically extending tire gripping elements, a support for said elements, parallelogram linkage means extending substantially vertically from the top of each element to said support, the lowermost pivots of said parallelogram linkage means being laterally spaced from each other and connected to said respective gripping elements adjacent the top edge thereof, both the interior and exterior of said elements thus being clear to grip a tire carcass; means operative to swing said elements toward and away from each other comprising a piston-cylinder assembly mounted on said support, and means connecting each of said elements with said piston-cylinder assembly radially to move said elements in response to extension or retraction of said piston-cylinder assembly.

2. The combination set forth in claim 1 including a bladder detector mounted on said support and extending vertically downwardly within said elements operative to detect the position of a shaping bladder expanding upwardly within a tire carcass held by said vertically extending tire gripping elements.

3. The combination set forth in claim 1 including a carcass detector mounted on said support including a detector arm extending into said gripping elements operative to detect the proper relative position of said elements and such carcass whereby such carcass may be gripped properly by radial movement of said elements.

4. A tire carcass loader for a tire curing press comprising a support, radially movable vertically elongated chuck elements, means supporting said elements at one end only thereof from said support for such radial movement operative to maintain said elements parallel at all radial positions thereof, said elements being operative thus either interiorly or exteriorly to grip a tire carcass, said means supporting said elements including substantially vertically extending parallel links suspending said elements from said support, the lowermost pivots of said parallel links being laterally spaced from each other and connected to said respective chuck elements adjament the top edge thereof; means radially to move said elements comprising a piston-cylinder assembly mounted on said support, an actuator connected to said piston-cylinder assembly for vertical movement, and link means connecting said actuator to one of said parallel links for each element operative radially to move said elements in response to vertical movement of said actuator.

5. A tire carcass holder as set forth in claim 4 including a bladder detector mounted on said support and extending vertically downwardly within said elements operative to detect the position of a shaping bladder expanding upwardly within a tire carcass held by said vertically extending tire gripping elements.

6. A tire carcass loader as set forth in claim 4 including a carcass detector mounted on said support including a detector arm extending into said gripping elements operative to detect the proper relative position of said elements and such carcass whereby such carcass may be gripped properly by radial movement of said elements.

7. A chuck element for a tire carcass holder comprising a vertically elongated member having a flat planar inner surface and a conical exterior surface, and an interior arcuate groove at the bottom thereof, the lower portion of said groove being roughened.

References Cited by the Examiner
UNITED STATES PATENTS

| | | | |
|---|---|---|---|
| 2,946,088 | 7/1960 | Soderquist | 18—17 X |
| 2,997,738 | 8/1961 | Soderquist | 18—2 |
| 3,065,499 | 11/1962 | Brundage et al. | 18—2 |
| 3,065,503 | 11/1962 | Mallory et al. | |
| 3,067,466 | 12/1962 | Smith et al. | 18—17 |
| 3,167,810 | 2/1965 | Soderquist | 18—2 |

J. SPENCER OVERHOLSER, *Primary Examiner.*

J. HOWARD FLINT, *Examiner.*